(12) United States Patent
Dolfing et al.

(10) Patent No.: US 6,421,640 B1
(45) Date of Patent: Jul. 16, 2002

(54) SPEECH RECOGNITION METHOD USING CONFIDENCE MEASURE EVALUATION

(75) Inventors: Jannes G. A. Dolfing; Andreas Wendemuth, both of Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/395,048

(22) Filed: Sep. 13, 1999

(30) Foreign Application Priority Data

Sep. 16, 1998 (DE) ......................................... 198 42 405

(51) Int. Cl.⁷ ............................................. G10L 15/08
(52) U.S. Cl. ...................... 704/236; 704/231; 704/240; 704/239
(58) Field of Search ................................ 704/256, 232, 704/231, 240, 255, 235, 239, 243, 251, 253, 242, 252, 254, 257, 238, 246, 236

(56) References Cited

U.S. PATENT DOCUMENTS

| | | | | |
|---|---|---|---|---|
| 5,267,345 A | * | 11/1993 | Brown et al. | 704/255 |
| 5,371,809 A | * | 12/1994 | Deseino | 382/15 |
| 5,710,866 A | * | 1/1998 | Alleva et al. | 704/256 |
| 6,256,609 B1 | * | 7/2001 | Byrnes et al. | 704/246 |

OTHER PUBLICATIONS

Schaaf et al., ("Confidence Measures for spontaneous speech recognition", Proc. ICASSP, vol. II, pp. 875–878, 1997).*

Wendemuth et al.,("Advances in confidence measures for large vocabulary", Proc. 1999, IEEE International conference on Acoustics, Speech and Signal Processing, vol. 2, 1999, pp. 705–708).*

"Confidence Measures for Spontaneous Speech Recognition" by T. Kemp et al, Proc. ICASSP, vol. II, pp. 875–878, 1997.

"Neural Networks for Pasttern Recognition" by C. Bishop, Oxford 1995, chapter 6.7.

"Learning the Unlearnable" by A. Wendemuth, J. Phys. A, 28:5423, 1995.

* cited by examiner

Primary Examiner—Vijay B Chawan
(74) Attorney, Agent, or Firm—Daniel J. Piotrowski

(57) ABSTRACT

The invention relates to a method of automatically recognizing speech utterances, in which a recognition result is evaluated by means of a first confidence measure and a plurality of second confidence measures determined for a recognition result is automatically combined for determining the first confidence measure. To reduce the resultant error rate in the assessment of the correctness of a recognition result, the method is characterized in that the determination of the parameters weighting the combination of the second confidence measures is based on a minimization of a cross-entropy-error measure. A further improvement is achieved by means of a post-processing operation based on the maximization of the Gardner-Derrida error function.

7 Claims, 1 Drawing Sheet

SPEECH RECOGNITION METHOD USING CONFIDENCE MEASURE EVALUATION

FIELD OF THE INVENTION

The invention relates to a method of automatically recognizing speech utterances, in which a recognition result is evaluated by means of a first confidence measure and a plurality of second confidence measures determined for a recognition result is automatically combined for determining the first confidence measure.

The method according to the invention can be particularly used in the field of "command and control" applications, in which electric apparatuses are controlled by means of single speech utterances (usually single words). This method is also applicable in the field of dictations.

By evaluating speech recognition results by means of a confidence measure (=reliability measure) it is decided whether a recognition result represents the actually presented speech utterance in a sufficiently reliable manner for the relevant application. To this end, the determined confidence measure is compared with a threshold. The user may be required to repeat his speech utterance.

DESCRIPTION OF PRIOR ART

The basic idea of combining a plurality of confidence measures for determining a resultant confidence measure is known from T. Kemp, T. Schaaf, "Confidence measures for spontaneous speech recognition", Proc. ICASSP, vol. II, pp. 875–878, 1997. Different combination possibilities are indicated which are, however, not explained individually.

SUMMARY OF THE INVENTION

It is an object of the invention to reduce the resultant error rate in the assessment of the correctness of a recognition result in the method described above.

This object is solved in that the determination of the parameters determining the combination of the second confidence measures is based on a minimization of a cross-entropy-error measure.

In this way, particularly parameter values are obtained which serve as weights in a linear combination of the second confidence measures so as to obtain the first confidence measure.

For a further reduction of the error rate, the method is characterized in that the confidence measure is adapted by means of a user and/or speech utterance-specific offset before comparison with a threshold value serving as the decision limit.

When comparing the confidence measure, which may also consist of a combination of confidence measures, with a threshold value, an automatic adaptation to given applications is simply possible without having to adapt the threshold value.

The invention also relates to a speech recognition system comprising processing units for evaluating a recognition result by means of the method described hereinbefore.

These and other aspects of the invention are apparent from and will be elucidated with reference to the embodiment(s) described hereinafter.

BRIEF DESCRIPTION OF THE DRAWING

In the drawing:

The sole figure shows the essential components of a speech recognition system according to the invention.

DETAILED DESCRIPTION OF THE PREFERRED EMBODIMENTS

Figure 1:
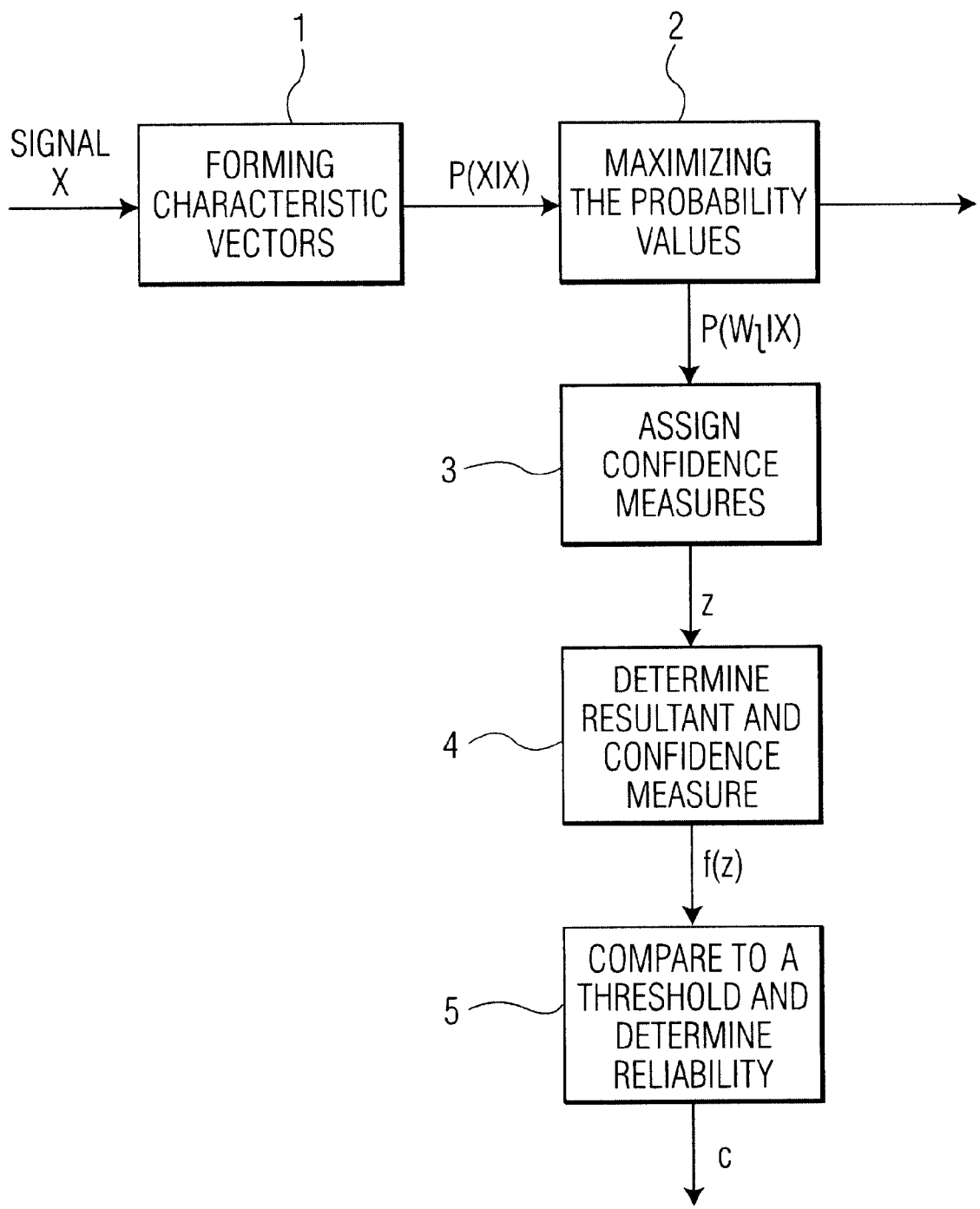

A sequence $X=x_1, x_2, \ldots, x_T$ of characteristic vectors $x_t$ with the time variables $t=1, \ldots, T$ representing a speech utterance, particularly a single word, is applied to a function block 1 of the speech recognition system shown. For forming the characteristic vectors $x_t$, a speech signal present in an electric form is sampled, quantized and subjected to a Cepstral analysis. The speech signal is divided into consecutive frames which partially overlap each other. For each frame, Cepstral values are formed which are combined in a characteristic vector $x_t$. Function block 1 also represents the conventional stochastic speech signal processing by generating production probability values $P(W|X)$ for a probability of a speech utterance W, given the sequence W, for which Markov models HMM (Hidden Markov Models) and the known Bayes' rule are used. The function block 2 now constitutes the maximum $P(W_1|X)$ of the production probability values $P(W|X)$. The speech utterance $W_1$ is evaluated as a recognition result and may be used, for example, as a control signal, for further processing in an electric apparatus. The probability values $P(W_1|X)$ determined are further subjected to a processing operation represented by a function block 3, in which a confidence measure vector $z=(z_1, \ldots, z_N)$ with N>1 is assigned to each value $P(W_1|X)$, and in which the N components comprise the confidence measures $z_1, \ldots, z_N$ (second confidence measures). Each confidence measure has a value whose magnitude is a measure of the reliability of the recognition result $W_1$.

The following examples for possible confidence measures will be mentioned for N=5.

$z_1$: difference between the logarithmated probability of the best and second best speech utterance hypothesis at an instant t between the instant $t_{start}$, corresponding to the instant of reception of the first observation instant relating to the relevant speech utterance, and the instant $t_{end}$ corresponding to the last observation instant relating to the relevant speech utterance ("two-best");

$z_2$: a difference between the logarithmated probability of the best value and the average value of the logarithmated probability of the n (for example, n=20) best end hypotheses of the relevant speech utterance at the instant t which is also between the instants $t_{start}$ and $t_{end}$ ("n-average-best");

$z_3$: assuming that each speech utterance hypothesis starts with a logarithmated probability $l_w$ at the instant $t_{start}$ and ends as an end hypothesis at the instant $t_{end}$, the difference between the logarithmated probability $l_w$ and the sum of the score (=logarithmated probability values) of the best states of the relevant HMM in the range ($t_{start}$, $t_{end}$) is calculated ("n-best-state");

$z_4$: length-scaled logarithmated probability ("avg-acoustic")

$$l_w' = l_w/(t_{end} - t_{start} + 1);$$

$z_5$: ratio between the number of HMM states of the word and the number of observations, determined by $t_{end} - t_{start}$ ("speaking rate").

A confidence measure yielding an improved classification result is obtained when instead of such simple original (rough) confidence measures (second confidence measures) an extended vector $z = z_{20} = (z_1^2, z_1 z_2, z_1 z_3, \ldots, z_5^2)$ is formed, whose components comprise modified confidence measures (modified second confidence measures) which are formed by multiplication of two of the original confidence measures, namely each original confidence measure is multiplied by every other original confidence measure. This formulation may also be modified by multiplying original confidence measures for forming modified confidence measures.

A resultant confidence measure f(z) (first confidence measure), which is compared with the threshold value $\tau$ (function block 5), is now formed (function block 4) for a recognition result $W_1$ by combination in accordance with a combination function f(z), described hereinafter, from the different confidence measures $z_1, \ldots, z_N$ (or the modified confidence measures). Dependent on the result of this comparison, a classification result c is generated which implies that the relevant recognition result $W_1$ is evaluated as being either insufficiently reliable (then c=0) or sufficiently reliable (then c=1). In the first-mentioned case, the user is, for example, required to repeat his speech utterance.

To derive the mode of combination of the confidence measures z, vector $z_e=(z,1)$ is now defined. A decision limit $f(z)=\tau$ is to be determined, which will be explained hereinafter. When a linear combination of the confidence measures is given with $$f(z)=J_1z_1+J_2z_2+\ldots+J_Nz_N$$

and the weights (multipliers) $J_1 \ldots J_N$ are combined with the threshold value $\tau$ to a vector $J=(J_1, J_2, \ldots, J_N, \tau)$, a scalar product is obtained $$a=z_e J.$$

By using Bayes' formula, the a posteriori probability $P(c|z_e)=$: y can be written in a sigmoid form as:

$$y = \frac{1}{1+e^{-a'}} \quad \text{with} \quad a' = \ln\frac{P(z_e|c=1)P(c=1)}{P(z_e|c=0)P(c=0)}.$$

It is now assumed that class-conditioned probability values $P(z_e|c)$ are members of a family of exponential distribution functions (particularly Gauss and Bernoulli distribution functions). Under this condition, it holds that a=a'. Such a formulation can be used for a great many applications.

In accordance with Bayes' rule, the decision limit must be at y=0.5. It follows that a=a'=0, being the decision limit in the model chosen.

In order to get an appropriate error function for the relevant Bayes' decision problem and to determine the parameters $J_1 \ldots J_N$ by means of a training, the conditioned probability $P(c|z_e)$ is now written as $$P(c|z_e)=y^c(1-y)^{1-c},$$

which corresponds to a special case of a Bernoulli distribution. With instants i corresponding to iteration steps, for which independently determined training data are provided, the probability L relating to the overall training data can now be expressed as $$L = \prod_i P(c_i|z_{i,e}) = \prod_i y_i^{c_i}(1-y_i)^{1-c_i}$$

A minimization of an error function E=-log (L) is thereby equivalent to a minimization of the so-called cross-entropy error $$E = -\sum_i \{c_i \log(y_i) + (1-c_i)\log(1-y_i)\}$$

This error function has the advantage that small probability values are very well estimated, for example, essentially better than by means of an LMS error function (Least Mean Square). The minimization of the cross-entropy E to be performed during training leads with $$\frac{\partial E}{\partial a_i} = y_i - c_i.$$

to a stochastic sequence used as a learning rule during a training $$\delta J(i) = -\eta \frac{\partial E}{\partial a_i} \nabla_J a_i = \eta z_{i,e}\left(c_i - \frac{1}{1+e^{-a_i}}\right),$$

which is additively superimposed on a J already determined, so that finally the components of J can be updated by means of the negative gradient of the error function E. $\eta$ is a suitable constant to be determined heuristically.

This learning rule is now used for training a neural network with a layed and a sigmoid-shaped output function which is finally used for realizing the function f(z). Further information on the structure and operation of such a neural network can be found in the book by C. Bishop "Neural Networks for Pattern Recognition" Oxford, 1995, chapter 6.7. The part between brackets in the formula for $\delta J(i)$ is in the range between −1 and 1. In the case of completely false classification, the peripheral values −1 or 1 are reached. The learning rule $\delta J(i)$ thereby corresponds to the rule used for training conventional perceptrons.

Such a training is preferably followed by a post-processing operation which is based on the maximization of the so-called Gardner-Derrida error function by means of the similarly named algorithm (see A. Wendemuth, "Learning the Unlearnable", J. Phys. A, 28:5423, 1995). In this way, a better adaptation of the training to outliers (for example, data with very high values of the components of the confidence measure vector z) and to sampling effects (for example, false classifications are ignored by training data) is realized in that the decision threshold $\tau$ and the weights J are adapted to particularities of the training data, such as the ones mentioned.

A further improvement of the error rate in the classification of a recognition result as being correct or false is achieved in that the decision problem $f(z)<\tau$ is augmented by a user-specific offset $o_{bj}$, a speech utterance-specific offset $o_{wk}$ or a user and speech utterance-specific offset $o_{bj,wk}$. The resultant decision limits are:

$$f(z)-o_{bj}=\tau_{bj},$$

$$f(z)-o_{wk}=\tau_{wk},$$

$$f(z)-o_{bj,wk}=\tau_{bj,wk}.$$

The user-specific offset $o_{bj}$ is, for example, the average value, the maximum or the minimum of the reliability measures ($z_1$, $z_2$, $z_3$, $z_4$ or $z_5$) determined for training utterances by the user $b_j$. The speech utterance-specific offset $o_{wk}$ is, for example, the average value, the maximum or the minimum of the reliability measures ($z_1$, $z_2$, $z_3$, $z_4$ or $z_5$) determined for training utterances of the word $w_k$, independently of the user. The offset $o_{bj,wk}$ is fundamentally determined in the same way as the offset $o_{w,k}$, but it is defined as being user-dependent.

What is claimed is:

1. A method of automatically recognizing speech utterances, the method comprising the steps of:
   evaluating a recognition result using an initial confidence measure and a plurality of second confidence measures determined for a recognition result,
   determining a resulting confidence measure by combining the initial confidence measure and the plurality of second confidence measures, wherein the determining step includes,
   determining parameters for the combining of the second confidence measures using a minimization of a cross-entropy-error measure.

2. The method as claimed in claim 1, wherein the resulting confidence measure is a linear combination of the second confidence measures.

3. The method as claimed in claim 1, wherein in the determination of the parameters weighting the combination of the second confidence measures on the basis of the minimization of the cross-entropy-error measure, a post-processing operation is performed on the basis of maximization of the Gardner-Derrida error function.

4. A method as claimed in claim 1, wherein the combination of the second confidence measures is preceded by a pre-processing operation in which the second confidence measures are formed by multiplication of a plurality third rough confidence measures.

5. The method as claimed in claim 1, wherein the step of determining the modified second confidence measures, every second confidence measure is multiplied by every other second confidence measure, and in that the modified second confidence measures are subjected to said combination for forming the resulting confidence measure.

6. The method of automatically recognizing speech utterances, in which a recognition result is evaluated by means of a confidence measure, as claimed in claim 1, wherein the confidence measure is adapted by means of a user and/or speech utterance-specific offset before comparison with a threshold value serving as the decision limit.

7. The speech recognition system comprising processing units for evaluating a recognition result by means of a method as claimed in claim 1.

* * * * *